(12) United States Patent
Ugaji et al.

(10) Patent No.: US 6,480,003 B1
(45) Date of Patent: Nov. 12, 2002

(54) METHOD FOR DETECTING DETERIORATION OF ELECTROCHEMICAL DEVICE, METHOD FOR MEASURING REMAINING CAPACITY, CHARGER COMPRISING THEM, AND DISCHARGE CONTROLLER

(75) Inventors: Masaya Ugaji, Neyagawa (JP); Miho Kayama, Hirakata (JP); Kenichi Takeyama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/762,974
(22) PCT Filed: Jun. 12, 2000
(86) PCT No.: PCT/JP00/03823
§ 371 (c)(1),
(2), (4) Date: Mar. 29, 2001
(87) PCT Pub. No.: WO00/79634
PCT Pub. Date: Dec. 28, 2000

(30) Foreign Application Priority Data

Jun. 18, 1999 (JP) .............................................. 11-173069

(51) Int. Cl.[7] .......................... H02N 7/00; G01N 27/416
(52) U.S. Cl. ...................................... 324/430; 320/132
(58) Field of Search .......................... 324/430; 320/132, 320/134, 136

(56) References Cited

U.S. PATENT DOCUMENTS 5,650,712 A * 7/1997 Kawai et al. ................ 320/150
5,994,877 A * 11/1999 Seri et al. .................... 320/132
6,317,697 B1 * 11/2001 Yoshikawa et al. ......... 320/149

FOREIGN PATENT DOCUMENTS

| JP | 3-182063 | 8/1991 |
|----|----------|--------|
| JP | 8-265984 | 10/1996 |
| JP | 10-232273 | 9/1998 |
| JP | 11-14717 | 1/1999 |

OTHER PUBLICATIONS

"Some aspects of battery impedance characteristics", J.M. Hawkins et al., Telecommunications Energy Conference, INTELEC '95, 17th INternational (1995), pp. 271–276, 12/95.

* cited by examiner

Primary Examiner—Gregory J. Toatley, Jr.
(74) Attorney, Agent, or Firm—McDermott, Will & Emery

(57) ABSTRACT

The present invention is a deterioration detecting method for an electrochemical device comprising electrodes and an ion conductor, wherein an electrochemical characteristic of the electrochemical device is detected, and an obtained value is then compared with a standard electrochemical characteristic of the electrochemical device to estimate the degree of deterioration of the electrochemical device. Further, the capacity of the device is found based on the detected degree of deterioration, and using this and the output of the device, a remaining capacity of the device is estimated. Accordingly, the degree of deterioration and the remaining capacity of an electrochemical device such as a secondary battery can be accurately detected.

12 Claims, 5 Drawing Sheets

F I G. 5
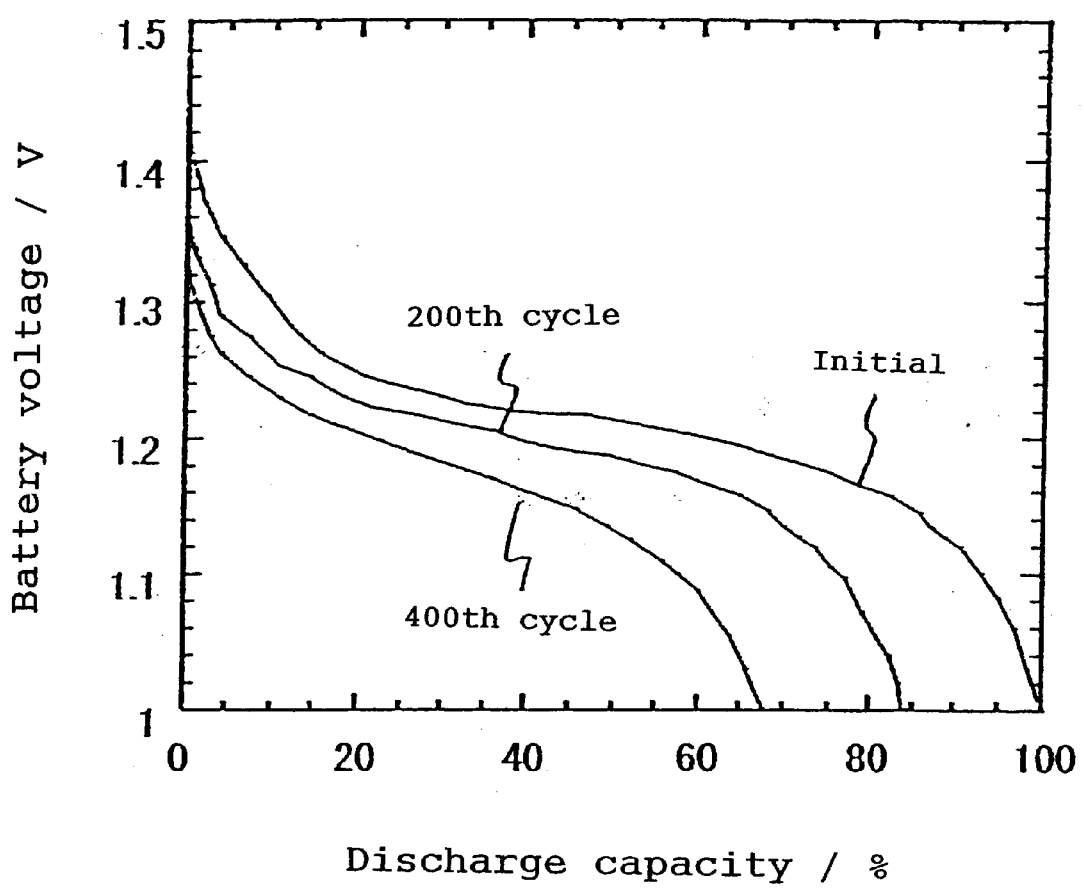

METHOD FOR DETECTING DETERIORATION OF ELECTROCHEMICAL DEVICE, METHOD FOR MEASURING REMAINING CAPACITY, CHARGER COMPRISING THEM, AND DISCHARGE CONTROLLER

TECHNICAL FIELD

The present invention relates to a deterioration detecting method and a remaining capacity detecting method for an electrochemical device.

BACKGROUND ART

Electrochemical devices, such as batteries, capacitors, and electrochromic devices, are widely used in electric appliances and electronic appliances. In particular, batteries have been attracting a rapidly increasing attention recently with the spread of portable appliances, such as notebook computers, portable telephones, and video cameras, the increase in energy demand, the problem in global environment, and the like.

As batteries which are typical electrochemical devices, various types of batteries are known and they fall into two major categories of non-rechargeable primary batteries and rechargeable secondary batteries.

As the primary batteries, there are exemplified alkaline batteries, manganese batteries, lithium batteries, air-zinc batteries and the like. On the other hand, as the secondary batteries, there are exemplified lithium ion secondary batteries which are in rapid spread recently, nickel-metal hydride storage batteries which are used as a large power supply for electric cars and the like, nickel-cadmium storage batteries, lead-acid storage batteries, and the like.

As the alternative batteries, there are exemplified physical batteries such as fuel cells for generating electricity with fuel, solar cells for generating electricity with the sunlight, and thermoelectric exchange cells for generating electricity with earth heat or the like.

Presently desired is enhancement in the capacity and the energy density of batteries. Further, regarding secondary batteries, desired is improvement in charge/discharge cycle characteristics. In order to meet these requirements, development has been intensively made for the materials and the like to be used for these batteries.

When batteries are stored in a deeply-charged state for a long time or undergo charge/discharge cycles under a high ambient temperature, certain secondary batteries deteriorates, and hence the capacity thereof decreases. Once the capacity of the batteries has decreased, the original battery capacity does not recover even after sufficient charging. The reason of this is thought to be attributed to decomposition of the ion conductor in the electrolyte, irreversible chemical reactions in the interface between the ion conductor and the electrode active material, irreversible phase transition reactions of the electrode active material and the like. Such deterioration of batteries substantially depends on ambient temperature, duration of storing, charge/discharge cycle condition, and therefore it has hitherto been difficult to accurately estimate the degree of deterioration unless the batteries are disassembled.

Because of the above-mentioned difficulty in accurately estimating the degree of deterioration, accuracy has been also poor in the detection of remaining capacity of deteriorated batteries. In particular, accuracy has been much poorer in the detection of remaining capacity of batteries having undergone high temperature storing or repeated charge/discharge cycles.

An object of the present invention is to resolve the above-mentioned problems and provide a deterioration detecting method for accurately detecting the degree of deterioration of an electrochemical device such as a secondary battery and a remaining capacity detecting method for accurately detecting the remaining capacity even for a deteriorated electrochemical device.

DISCLOSURE OF INVENTION

The present invention relates to a deterioration detecting method for an electrochemical device comprising electrodes and an ion conductor, wherein an electrochemical characteristic of the electrochemical device is detected, and an obtained detection value indicating the electrochemical characteristic is then compared with a reference value indicating a standard electrochemical characteristic of the electrochemical device to estimate the degree of deterioration of the electrochemical device.

In the above method, it is effective that a model which expresses an electrochemical characteristic by a parameter of the electrochemical characteristic of a component of the electrochemical device, that a value of the parameter indicating the electrochemical characteristic of the component is calculated from a detection value obtained by detecting the electrochemical characteristic of the electrochemical device, and that the value of the parameter is compared with a reference value indicating a standard electrochemical characteristic of the component to estimate the degree of deterioration of the electrochemical device.

In particular, it is effective that the parameter is the sum of the internal resistance of the electrode and the internal resistance of the ion conductor.

With regard to the model, it is effective to use at least one selected from the group consisting of a potential model of the electrode, an electron transport model of the electrode, an ion transport model of the electrode, an ion transport model of the ion conductor, and a model representing an electrochemical reaction occurring in the interface between the electrode and the ion conductor.

Further, the present invention also relates to a remaining capacity detecting method, wherein a capacity value of the electrochemical device is estimated based on the degree of deterioration obtained by the deterioration detecting method for an electrochemical device, and a remaining capacity of the electrochemical device is calculated using the obtained capacity value.

Furthermore, the present invention relates to a charger comprising: a means for detecting an electrochemical characteristic of a battery; a means for estimating the degree of deterioration of the battery by comparing an obtained electrochemical characteristic with a standard electrochemical characteristic of the battery; and a means for controlling the charge of the battery based on the obtained degree of deterioration; and a discharge controlling apparatus comprising: a means for detecting an electrochemical characteristic of a battery; a means for estimating the degree of deterioration of the battery by comparing an obtained electrochemical characteristic with a standard electrochemical characteristic of the battery; and a means for controlling the discharge of the battery based on the obtained degree of deterioration.

BRIEF DESCRIPTION OF DRAWINGS

FIG. 5 is a diagram showing discharge curves for batteries each having the different number of charge/discharge cycles, which were detected in another example of the present invention.

BEST MODE FOR CARRYING OUT THE INVENTION

Figure 1:
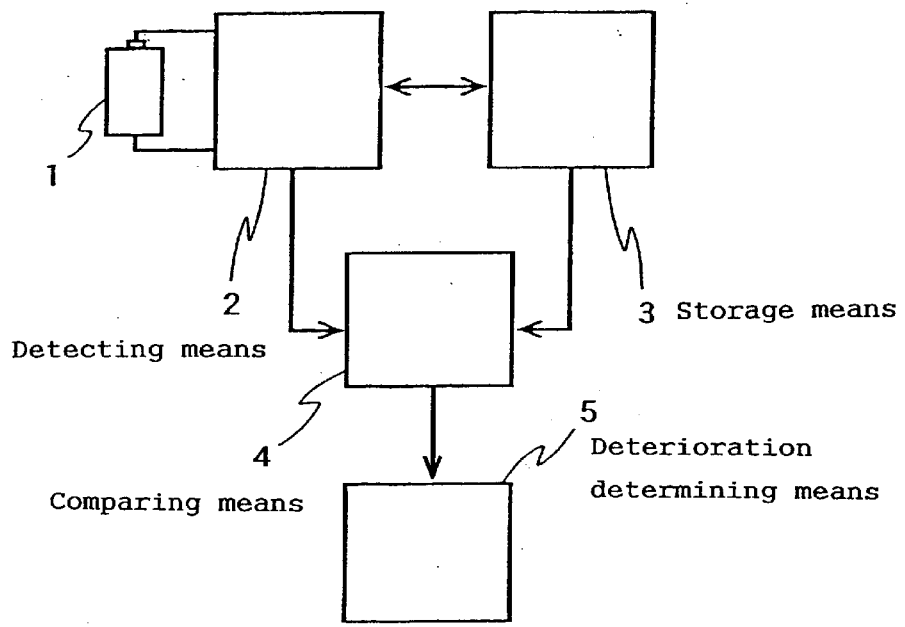
FIG. 1 is a block diagram showing the configuration of an apparatus for implementing a deterioration detecting method for an electrochemical device in accordance with the present invention.

The deterioration detecting method for an electrochemical device of the present invention is one for an electrochemical device comprising electrodes and an ion conductor, wherein an electrochemical characteristic of the electrochemical device is detected, and the detection value is then compared with a reference value indicating a standard electrochemical characteristic of the electrochemical device to estimate the degree of deterioration of the electrochemical device (hereinafter simply referred to as a "device").

The electrochemical characteristic mentioned herein indicates a characteristic caused by an electrochemical reaction occurring within the electrochemical device, and such a characteristic includes the charge/discharge characteristic, the impedance characteristic, and the direct-current pulse characteristic and the like.

In the present invention, in addition to the comparison of a value indicating a characteristic of the electrochemical device, which is obtained directly by an electrochemical measurement, the electrochemical characteristic of the device may be estimated using a model which expresses the electrochemical characteristic of the component (electrode and/or ion conductor) of the device by a parameter (hereinafter referred to as an "electrochemical parameter"). That is, a value of parameter indicating the electrochemical characteristic of the component, which is calculated from a detection value indicating the electrochemical characteristic of the detected device, may be compared with the reference value of the parameter indicating a standard electrochemical characteristic of the component to estimate the degree of deterioration of the device itself.

The use of such a parameter indicating the electrochemical characteristic of the component provides an advantage that a deteriorated part can be directly detected.

In particular, it is effective to use, as a parameter, the sum of the internal resistance of the electrode and the internal resistance of the ion conductor, because the deterioration causes, in many cases, a decrease in ion concentration and mobility within the ion conductor and a reduction of the electrode active material itself.

As the models representing the electrochemical characteristic of the device, there are exemplified a potential model of the electrode, an electron transport model of the electrode, an ion transport model of the electrode, an ion transport model of the ion conductor, a model representing an electrochemical reaction occurring in the interface between the electrode and the ion conductor and the like. These models may be used separately or in arbitrary combination.

In accordance with the present invention, the deterioration of the electrochemical device can be detected as described above, thereby determining the capacity of the device at that time (at the time of deterioration detection). Accordingly, if the output of the device is determined together with the deterioration detection, the remaining capacity of the device can be accurately detected.

The deterioration detecting method and the remaining capacity detecting method as above are applicable, for example, to a charger. While an electrochemical characteristic of a device is detected during the charge, the degree of deterioration thereof can be detected, and thus the charge can be carried out correspondingly to the performance of the device. Therefore, this avoids an overcharging of the device, suppresses the cycle deterioration thereof, and thereby permits the sufficient realization of the performance thereof.

Further, discharging can be controlled correspondingly to the detected degree of deterioration of the device, thereby the service life of the device can be prolonged. For example, the operation mode of an electric appliance can be forcedly controlled so as to reduce the load on the device. Alternatively, a recommended mode of discharging or that of operation of the electric appliances can be displayed to leave the selection of the mode to the user.

Herein, FIG. 1 shows a schematic diagram illustrating a deterioration detecting apparatus used for implementing a deterioration detecting method for an electrochemical device in accordance with the present invention.

This apparatus comprises: a detecting means 2 for detecting an electrochemical characteristic of an electrochemical device 1; a storage means 3 for storing a standard electrochemical characteristic of the electrochemical device 1; a comparing means 4 for comparing the standard electrochemical characteristic with the electrochemical characteristic of the device; and a deterioration determining means 5 for determining the degree of deterioration of the electrochemical device 1 based on the results calculated by the comparing means 4.

The electrochemical characteristic of the electrochemical device to be detected for the deterioration determination is that caused by the electrochemical reaction occurring within the electrochemical device, and such characteristic can be recognized directly by the measurement of: the charge/discharge characteristic expressed by, a charge curve, a discharge curve and the like; the impedance characteristic and the like.

A reference value indicating the standard electrochemical characteristic used as the reference of the deterioration determination is previously stored in the storage means 3 comprising a magnetic recording device or the like. The reference value indicating the standard electrochemical characteristic is an initial value such as a value indicating the electrochemical characteristic of the device before deterioration. The reference value may also be a value indicating the electrochemical characteristic at a predetermined time before the detection of electrochemical characteristic or a value indicating the electrochemical characteristic detected predetermined charge/discharge cycles ago.

The standard electrochemical characteristic is not necessarily the same item as that of the detected electrochemical characteristic. For example, it may be a parameter constituting an electrochemical model expressing the detected electrochemical characteristic, that is, the value of the electrochemical parameter of the electrode and/or the ion conductor, which are components of the device.

Herein, the electrochemical model represents the state of the electrochemical device or the component thereof by using a mathematical formula or a circuit based on the electrochemical parameter. There can be exemplified a plurality of models such as a model representing the potential of the electrode, a model representing the electron transport of the electrode, a model representing the ion transport of the electrode, a model representing the ion transport of the ion conductor, and a model representing an electrochemical reaction occurring in the interface between the electrode and the ion conductor.

Thus, the electrochemical parameter used for indicating the electrochemical characteristic of the component of the device may be, for example, the equilibrium potential $E_0$ of the electrode, the internal resistance $R_{ohm}$ of the electrode, the charge transfer resistance $R_{ct}$ due to the electrochemical reaction occurring in the interface between the electrode and the ion conductor, the ion transport resistance $R_{mt}$ or $R_{ele}$ in the electrode or the ion conductor, or the capacitance $C_{dl}$ of the electric double layer in the interface between the electrode and the ion conductor.

The detecting means 2 detects the electrochemical characteristic of the electrochemical device 1. For example, a predetermined current signal or voltage signal is input to the electrochemical device 1, and the response current or voltage is detected.

The comparing means 4 determines the degree of deterioration of the device 1 at the time of detection based on the detected electrochemical characteristic of the electrochemical device 1. The advance of deterioration of the device 1 causes a difference between the reference value indicating the standard electrochemical characteristic, which is stored in the storage means 3, and the detected value indicating the electrochemical characteristic of the device 1. The comparing means 4 detects this difference, thereby determining the degree of deterioration of the device 1.

In case of the use of an electrochemical model representing the electrochemical characteristic of the device 1 by an electrochemical parameter, the comparing means 4 stores the electrochemical model as a mathematical formula or a relational table comprising a theoretical formula, an empirical approximate formula or the like. Then, the value of the constituting parameter is calculated based on the detected electrochemical characteristic. The comparing means 4 further compares the value of the parameter with the reference value of the parameter of the standard electrochemical characteristic. The parameter mentioned herein may include a single parameter and a combination of a plurality of parameters.

The deterioration determining means 5 determines the degree of deterioration indicating how the electrochemical device has deteriorated based on the difference between the parameter value calculated by the comparing means 4 and the reference value.

Figure 2:
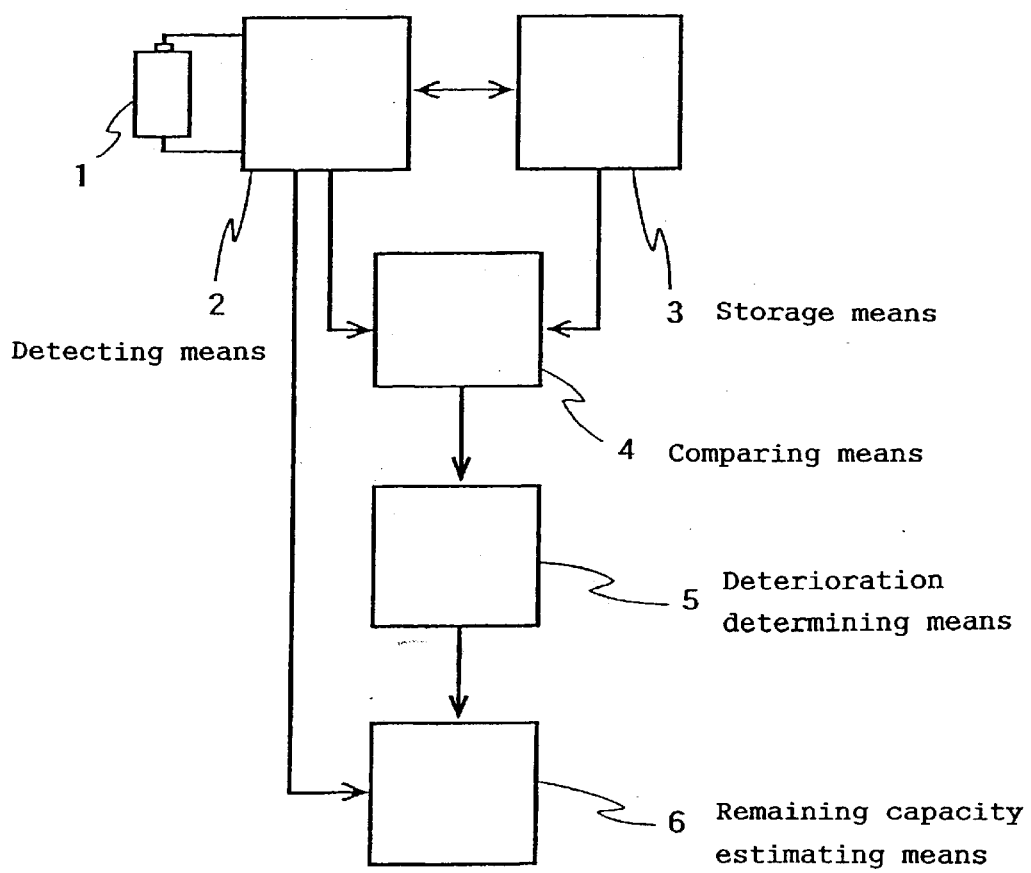
FIG. 2 is a block diagram showing the configuration of an apparatus for implementing a remaining capacity detecting method for an electrochemical device in accordance with the present invention.

As such, the detection of deterioration of the electrochemical device permits the estimation of remaining capacity corresponding to the deterioration of the device. FIG. 2 shows a schematic diagram illustrating the configuration of a remaining capacity detecting apparatus of the present invention.

Similarly to the above-mentioned deterioration detecting apparatus, the present apparatus comprises: a detecting means 2 for detecting an electrochemical characteristic of an electrochemical device 1; a storage means 3 for storing a standard electrochemical characteristic of the electrochemical device 1; a comparing means 4 for comparing the standard electrochemical characteristic with the electrochemical characteristic of the device; and a deterioration determining means 5 for determining the degree of deterioration of the electrochemical device 1 based on the results calculated by the comparing means 4. These work similarly to those in the above-mentioned apparatus. However, the detecting means 2 always monitors the output of the device 1.

A remaining capacity estimating means 6 corrects the capacity of the device 1 based on the degree of deterioration of the device 1 calculated by the deterioration determining means 5. Further, it calculates the remaining capacity of the device 1 based on both the integrated value of the output current of the device 1 obtained by the signal from the detecting means 2 and the corrected capacity.

Next, electrochemical models used in the present invention are described below in detail with reference to an example. In general, a model representing the potential of an electrode in an electrochemical device represents the potential of the electrode in an unloaded state, that is, the potential of the electrode in the equilibrium state.

When the electrode reaction is expressed by Equation (1):

$$Ox + ne^- \Leftrightarrow Red \qquad (1)$$

wherein Ox is oxidized form for a substance, n is number of reaction electrons, $e^-$ is electron and Red is reduced form for a substance, the equilibrium potential formula representing the potential of the electrode is expressed by Equation (2):

$$E_{eq} = E_0 + \frac{RT}{nF} \ln \frac{[Ox]}{[Red]} \qquad (2)$$

wherein $E_{eq}$ is equilibrium potential of the electrode, $E_0$ is standard potential of the electrode, R is gas constant, T is absolute temperature, F is Faraday constant, [Ox] is activity of Ox, and [Red] is activity of Red.

Here, the parameters $E_0$, [Ox], and [Red] are determined by the electrode material. By using a temperature coefficient $dE(T)/dT$ as a parameter, the standard potential $E_0(T)$ at a temperature T is expressed by Equation (3):

$$E_0(T) = E_0(293) + \frac{dE(T)}{dT}(T - 293) \qquad (3)$$

By using the electrode internal resistance $R_{ohm}$, the electrode charge transfer resistance $R_{ct}$, and the mass transfer resistance $R_{mt}$, the amount of potential polarization of the electrode in a loaded state, i.e., the magnitude of the electrochemical polarization, is expressed by Equation (4):

$$E - E_{eq} = \eta = i(R_{ohm} + R_{ct} + R_{mt}) \qquad (4)$$

wherein E is potential, $\eta$ is amount of potential polarization of the electrode in a loaded state, i is working current, $R_{ohm}$ is internal resistance of the electrode, $R_{ct}$ is electrode charge transfer resistance representing the electron transport, and $R_{mt}$ is mass transfer resistance due to the ion transport phenomenon.

The electrode internal resistance $R_{ohm}$ represents the electron transport of the electrode, and is expressed by a model using the internal resistance of each electrode as a parameter. In the case of considering the potential polarization of the battery, a model is expressed by further including the resistance values of the battery components such as a lead wire and an IC circuit.

The electrode charge transfer resistance $R_{ct}$ is the electrode charge transfer resistance in an unloaded state; and hence, by using an approximate formula of the current-overvoltage formula shown in Equation (5):

$$i = i_0 \left\{ -\exp\left(-\frac{\alpha n F}{RT} \eta\right) + \exp\left(\frac{(1-\alpha)nF}{RT} \eta\right) \right\} \quad (5)$$

as a model representing the electrochemical reaction occurring in the interface between the electrode and the ion conductor, the $R_{ct}$ is expressed by Equation (6):

$$R_{ct} = \frac{RT}{nFi_0} = \frac{RT}{nF(nFk_0[Ox][Red])} \quad (6)$$

Here, the parameters $i_0$ and $\alpha$ are the exchange current density and the charge transfer coefficient of the electrode reaction, respectively. The exchange current density $i_0$ depends on the temperature, and is expressed by Equation (7):

$$i_0 = i_0(T) = i_0(293)\exp\left[\frac{E_a}{R}\left(\frac{1}{293} - \frac{1}{T}\right)\right] \quad (7)$$

The mass transfer resistance $R_{mt}$ as a model representing the ion transport is the resistance of the material transfer by the ion transport phenomenon of the electrode, and is deduced mathematically in the form of the activity of surface included in a general current-overvoltage formula, as shown in Equation (8):

$$i = i_0 \left\{ -\frac{[Ox(x=0,t)]}{[Ox]} \exp\left(-\frac{\alpha n F}{RT} \eta\right) + \frac{[Red(x=0,t)]}{[Red]} \exp\left(\frac{(1-\alpha)nF}{RT} \eta\right) \right\} \quad (8)$$

wherein Ox (x=0, t) is activity of the surface of oxidized form, and Red (x=0, t) is activity of the surface of reduced form.

Each of $R_{ohm}$, $R_{ct}$, and $R_{mt}$ is determined by the material constituting the electrode. Further, in a battery, the internal resistance $R_{ele}$ of the ion conductor needs to be added within the parentheses in the right hand side of Equation (4).

Here, the parameter Ea is the activation energy of the electrode reaction shown in Equation (1). The parameters Ox (x=0, t) and Red (x=0, t) can be deduced by setting an initial condition and a boundary condition into Equations (9) and (10) each representing the diffusion phenomenon:

$$i = -D_O \frac{d}{dx}[Ox(x,t)] = D_R \frac{d}{dx}[Red(x,t)] \quad (9)$$

$$\frac{\partial[Ox(x,t)]}{\partial t} = D_O \frac{\partial^2[Ox(x,t)]}{\partial x^2}, \quad (10)$$

$$\frac{\partial[Red(x,t)]}{\partial t} = D_R \frac{\partial^2[Red(x,t)]}{\partial x^2}$$

wherein [Ox (x, t)] is activity of the surface of oxidized form at position x and time t, [Red (x, t)] is activity of the surface of reduced form at position x and time t, $D_o$ is diffusion coefficient of the oxidized form, and $D_R$ is diffusion coefficient of the reduced form.

The activity is expressed by the product of a concentration and an activity coefficient. The diffusion coefficient D(T) at a temperature T is expressed by Equation (11):

$$D(T) = D(293)\exp\left[\frac{E_{diff}}{R}\left(\frac{1}{293} - \frac{1}{T}\right)\right] \quad (11)$$

wherein $E_{diff}$ is activation energy of the diffusion coefficient.

In the case of a low ion conductivity, by using a diffusion formula similar to Equation (9) and a migration under a potential gradient, the internal resistance $R_{ele}$ of the ion conductor representing the ion transport of the ion conductor is expressed by a model shown in Equation (12):

$$i = -D_i \frac{d}{dx} a_i(x,t) - \frac{z_i F}{RT} D_i a_i(x,t) \frac{d}{dx} \phi(x,t) \quad (12)$$

wherein $D_i$ is diffusion coefficient of an active species i, $a_i(x, t)$ is activity of the active species i at position x and time t, and $d(\phi(x, t))/dx$ is charge and potential gradient of the charge active species.

Further, an electric double layer is generally formed in the interface between the electrode and the ion conductor. The electric double layer can be considered as a kind of capacitor, and by using the electric double layer capacitor $C_{dl}$ as a parameter, the current $i_2$ consumed in the formation of electric double layer capacitor is expressed by Equation (13):

$$i_2 = C_{dl} \frac{dE}{dt} \quad (13)$$

In that case, the current I flowing in charging and discharging is expressed by Equation (14):

$$I = i + i_2 \quad (14)$$

In the case that a side reaction occurs in the electrode, an electrochemical module (a model representing a potential model of the electrode, an electron transport model of the electrode, an ion transport model of the electrode, an ion transport model of the ion conductor, and a model representing an electrochemical reaction occurring in the interface between the electrode and the ion conductor) for the side reaction can be described similarly to the above-mentioned case.

In that case, using the current $i_3$ consumed in the side reaction, Equation (14) is expressed by Equation (15):

$$I = i + i_2 + i_3 \quad (15)$$

As such, the electrode reaction shown in Equation (1) in each electrode can be expressed by the electrode reaction model of a combination of Equations (2) to (14) for each electrode. Accordingly, by solving these nonlinear simultaneous equations, the charging and discharging operation of the battery at a certain temperature can be reproduced.

In the above-mentioned equations, each parameter has a different value depending on the kind of the active material constituting the electrode, the kind of the electrolyte, the temperature within the battery, and the like. However, these equations can be used even when the deterioration has advanced owing to high temperature storing or charge/ discharge cycles. In particular, when the deterioration has advanced owing to high temperature storing or charge/discharge cycles, the polarization rate increases in comparison with the potential in an unloaded state, and therefore, each resistance shown in Equation (4) strongly affects the charging and discharging operation.

A reaction formula other than the above-mentioned one can be used for reproducing the charging and discharging operation. Further, for reproducing the charging and discharging operation, in addition to the above-mentioned nonlinear simultaneous equations, each relational formula used may be replaced by an approximate formula, or a description by using an electric circuit equivalent to each relational formula may be constructed and solved by a circuit simulator.

A deterioration detecting method in accordance with the present invention is described below using an electrochemical model applied to the case of a nickel-hydride secondary battery.

The nickel-hydride secondary battery is a secondary battery which uses nickel hydroxide as the positive electrode material and hydrogen storage alloy as the negative electrode material. Aqueous KOH solution is widely used as the ion conductor, i.e., the electrolyte. In the case of the nickel-hydride secondary battery, the electrode reaction shown in Equation (1) is expressed by the following Equations (16) and (17):

$$\text{Nickel electrode } NiOOH + e^- + H^+ \Leftrightarrow Ni(OH)_2 \quad (16)$$

$$\text{Hydride electrode } MH \Leftrightarrow M + H^+ + e^- \quad (17)$$

wherein M is hydrogen storage alloy, and MH is hydride.

In these reactions, a mobile ion species is a proton ($H^+$), and the electrochemical reactions of the nickel hydroxide and the hydrogen storage alloy depend on the activity of protons in each electrode.

In the case of the nickel electrode, Equations (2) and (8) to (10) are expressed by the following Equations (18) to (21), respectively.

$$E_{eq,Ni} = E_{0,Ni} + \frac{RT}{F} \ln \frac{c_{Ox}}{c - c_{Ox}} \quad (18)$$

$$i_{Ni,1} = \quad (19)$$
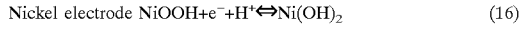
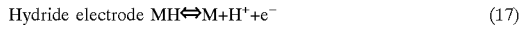

$$i_{Ni,1} = -D_{Ni} \frac{d}{dx} c_{Ox}(x, t) \quad (20)$$

$$\frac{\partial c_{Ox}(x, t)}{\partial t} = D_{Ni} \frac{\partial^2 c_{Ox}(x, t)}{\partial x^2} \quad (21)$$

wherein $c_{oxi}$ is concentration of nickel oxyhydroxide in an unloaded state, $c_{Red}$ is concentration of nickel hydroxide in an unloaded state, $c_{ox} + c_{red} = c$,
$c_{ox}(0, t)$ is concentration of nickel oxyhydroxide on the electrode surface at time t, $c_{Red}(0, t)$ is concentration of nickel hydroxide on the electrode surface at time t, $c_{ox}(0, t) + c_{Red}(0, t) = c$, and $D_{Ni}$ is chemical diffusion coefficient of protons.

Here, the $c_{ox}(0, t)$ and $c_{Red}(0, t)$ can be obtained by setting an initial condition and a boundary condition into Equations (20) and (21).

Further, Equation (13) is expressed by Equation (22):

$$i_{Ni,2} = C_{dl,Ni} \frac{dE}{dx} \quad (22)$$

From Equations (18) to (22), the electrode potential $E_{eq, Ni}$, the electrode charge transfer resistance $R_{ct, Ni}$ of the redox reaction occurring in the interface between the electrode and the ion conductor, and the ion transport resistance $R_{mt, Ni}$ of the electrode can be obtained. By adding the internal resistance and the electric double layer capacitance relating to the electron transport of the electrode to them, the redox reaction of the nickel electrode can be described.

In the case of the nickel electrode, a consideration is necessary for an oxygen generating reaction occurring in overcharging. The oxygen generating reaction is expressed by Equation (23):

$$4OH^- \Leftrightarrow H_2O + O_2 + 4e^- \quad (23)$$

The oxygen generating reaction occurring in overcharging is expressed by the potential model in an unloaded state and the amount of potential polarization in a loaded state similarly to the redox reaction of the nickel electrode. These relations are expressed by Equation (24):

$$E_{eq,NiOx} = E_{0,NiOx} + \frac{RT}{nF} \ln[O_2] = E_{0,NiOx} + \frac{RT}{nF} \ln K_s P_{O_2} \quad (24)$$

and Equation (25):

$$i_{Ni,3} = i_{0,NiOx} \exp\left(-\frac{\alpha_{NiOx} nF}{RT} \eta\right) \quad (25)$$

Herein, the activity of the generated oxygen molecule is expressed by the product of the solubility constant Ks of oxygen into aqueous KOH solution and the partial pressure $P_{O2}$ of oxygen. Further, the $i_{Ni, 3}$ denotes the proportion of the current used for the oxygen generating reaction in the total current. As such, in the case of considering the electric double layer and the oxygen generating reaction as a side reaction, the current I flowing through the nickel electrode in charging and discharging is expressed by Equation (26):

$$I = i_{Ni,1} + i_{Ni,2} + i_{Ni,3} \quad (26)$$

The partial pressure $P_{O2}$ of the generated oxygen is expressed by Equation (27):

$$P_{O2} = \frac{m_{O2} RT}{V} \quad (27)$$

wherein $m_{O2}$ is molar number of the generated oxygen, and V is battery volume.

Accordingly, using Equation (24), the amount of occurrence of the oxygen generating reaction can be found from the degree of polarization, and further, using Equation (25), the amount of consumption of the hydroxide ion in the ion conductor can be found from the current having flowed. Furthermore, Equation (27) provides the information of both the increase in the internal pressure of battery due to oxygen generation and the contribution to the oxygen generating reaction in overcharging. In the case of the hydrogen storage alloy electrode, similarly to the case of the nickel electrode, Equations (2) and (8) to (10) are expressed by the following Equations (28) to (31), respectively.

$$E_{eq,MH} = E_{0,MH} + \frac{RT}{F}\ln\frac{a_{Ox}}{a_{Red}} \quad (28)$$

$$i_{MH,1} = i_{0,MH} \left\{-\frac{a_{Ox}(0,t)}{a_{Ox}}\exp\left(-\frac{\alpha_{MH}nF}{RT}\eta\right) + \frac{a_{Red}(0,t)}{a_{Red}}\exp\left(\frac{(1-\alpha_{MH})nF}{RT}\eta\right)\right\} \quad (29)$$

$$i_{MH,1} = -D_{MH}\frac{d}{dx}a_{Ox}(x,t) \quad (30)$$

$$\frac{\partial a_{Ox}(x,t)}{\partial t} = D_{MH}\frac{\partial^2 a_{Ox}(x,t)}{\partial x^2} \quad (31)$$

wherein $a_{ox}$ is activity of hydrogen storage alloy M as the oxidized form in an unloaded state, $a_{Red}$ is activity of hydride MH as the reduced form in an unloaded state, $a_{ox}(0,t)$ is activity of hydrogen storage alloy M on the electrode surface at time t, $a_{Red}(0,t)$ is activity of hydride MH on the electrode surface at time t, and $D_{MH}$ is diffusion coefficient of protons as a mobile ion species.

As described above, the redox reaction in the hydrogen storage alloy electrode needs to be expressed in the activity rather than the concentration, which is different from the case of the nickel electrode.

Here, the $a_{ox}(0,t)$ and $a_{Red}(0,t)$ can be obtained by setting an initial condition and a boundary condition into Equations (30) and (31).

The electric double layer formed in the interface between the hydride electrode and the ion conductor is expressed by Equation (32):

$$i_{MHi,2} = C_{dl,MH}\frac{dE}{dx} \quad (32)$$

From Equations (28) to (31), the electrode potential $E_{eq, MH}$, the electrode charge transfer resistance $R_{ct, MH}$ of the redox reaction occurring in the interface between the electrode and the ion conductor, and the ion transport resistance $R_{mt, MH}$ of the electrode can be obtained. By adding the electrode resistance $R_{ohm, MH}$ and the electric double layer capacitance $C_{dl, MH}$ corresponding to the electron transport of the electrode to them, the redox reaction of the hydrogen storage alloy electrode can be described.

Since the electric double layer is considered even in the case of the hydrogen storage alloy electrode, the current I flowing in charging and discharging is expressed by Equation (33):

$$I = i_{MH,1} + i_{MH,2} \quad (33)$$

It is generally thought that a film is generated on the electrode surface of the hydride electrode, and hence it is desirable to add the ion transport resistance $R_{surf, MH}$ in the film and the capacitance $C_{surf, MH}$ of the film into the electrochemical model.

The preferred examples of a deterioration detecting method and a remaining capacity detecting method for an electrochemical device and of a charger in accordance with the present invention are described below in detail for the case that a battery is used.

EXAMPLE 1

Lithium ion secondary batteries each having a nominal capacity of 720 mAh and a nominal voltage of 3.6 V were stored in an atmosphere of 85° C. for one week, two weeks, three weeks, and one month, respectively for the purpose of advancing the deterioration thereof. A deterioration detecting method and a remaining capacity detecting method of the present invention were applied to these batteries to test the effectiveness thereof. The method of evaluation is described below.

According to a constant current-constant voltage charging method, which is the recommended method of charging of the present batteries, they were energized by a constant correct of 500 mA; and after the voltage reached 4.1 V, the voltage was maintained at the 4.1 V, and the charging was carried out for two hours in total. The remaining capacity of the batteries in this state was defined as 100%. The batteries having the remaining capacity of 100% were stored at a high temperature for the above-mentioned respective duration.

After the high temperature storing, each battery was discharged at a constant current of 144 mA in a thermostat at 20° C. until the voltage decreased to 3.0 V.

Figure 3:
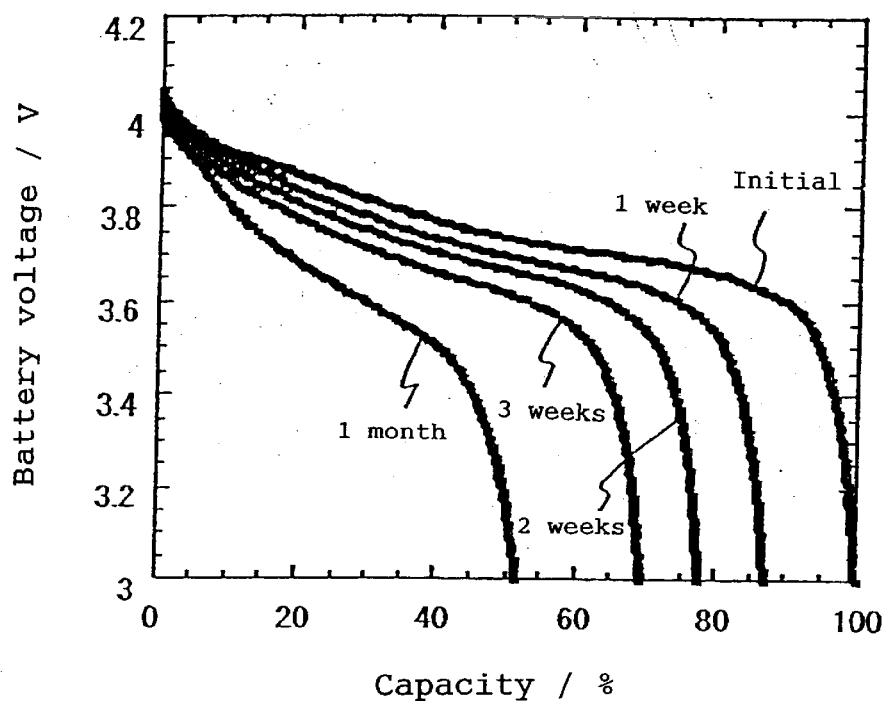
FIG. 3 is a diagram showing discharge curves for batteries each having a different stored duration, which were detected in an example of the present invention.

The behavior of voltage at that time is shown in FIG. 3. In FIG. 3, the vertical axis indicates the voltage, and the horizontal axis indicates the discharge capacity (normalized at 100%). As is obvious from FIG. 3, a battery of the longer storing duration has the smaller battery capacity, which shows the advancing of deterioration due to the high temperature storing.

Next, an impedance test was conducted on those batteries. Specifically, when the remaining capacity became 30%, each battery was applied with an alternating-current voltage having an amplitude of 5 mA, and the response current was observed in the case where a frequency was changed from 10 kHz to 10 MHz. The result is shown in FIG. 4.

Figure 4:
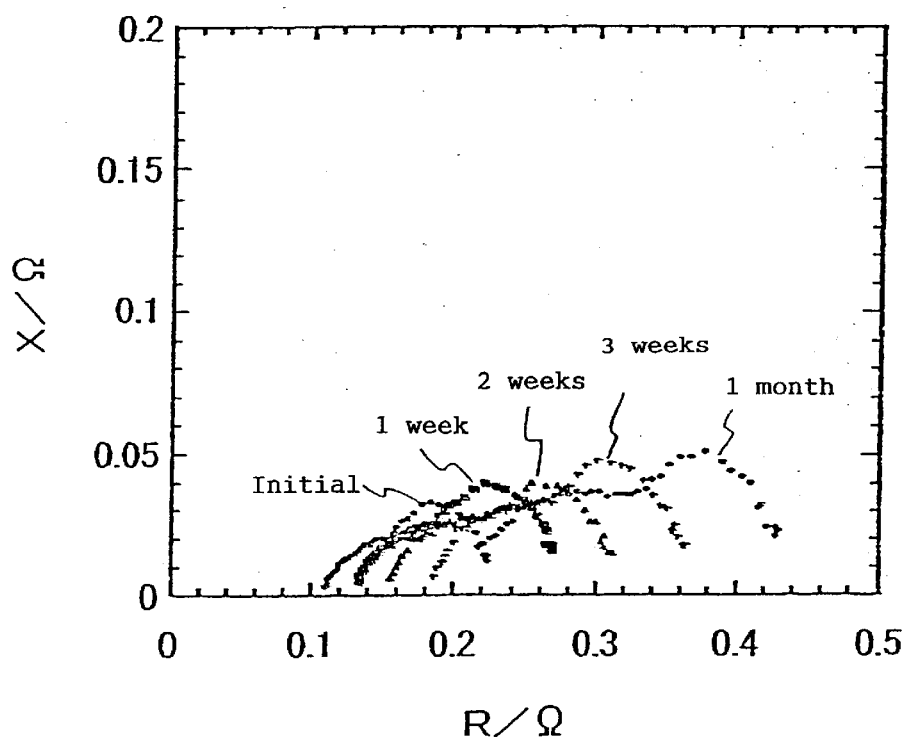
FIG. 4 is a Cole-Cole plot diagram showing the impedance characteristics of the same batteries.

In FIG. 4, the vertical axis indicates an imaginary number X, and the horizontal axis indicates a real number R. As shown in FIG. 4, a circular arc was observed for each battery. The radius of each circular arc indicates the electrode charge transfer resistance $R_{ct}$ (a model representing the electrochemical reaction occurring in the interface between the electrode and the ion conductor). Accordingly, it has been confirmed that the $R_{ct}$ increases with the advance of deterioration.

Further, it has been confirmed that the value of a point, where each circular arc intersects the real number axis, increases with the advance of deterioration. This value corresponds to the sum of the internal resistance $R_{ohm}$ of each electrode and the internal resistance $R_{ele}$ of each ion conductor, which are electrochemical parameters.

As such, the deterioration of a battery can be detected based on the high frequency characteristic thereof. The duration of high temperature storing, the discharge capacity, the frequency used for calculation, the $(R_{ohm}+R_{ele})$ and the degree of deterioration are shown in Table 1. Here, the degree of deterioration is expressed by (100−(discharge capacity after storing)) (%) on the assumption that the 100% discharge capacity is 720 mAh.

TABLE 1

| Duration of storing | Discharge capacity (%) | Frequency (Hz) | $R_{ohm} + R_{ele}$ (Ω) | Degree of deterioration (%) |
|---|---|---|---|---|
| None | 100 | 1000 | 0.110 | — |
| 1 week | 87.8 | 1000 | 0.133 | 12.2 |
| 2 weeks | 77.2 | 1000 | 0.155 | 22.8 |
| 3 weeks | 69.2 | 1000 | 0.186 | 30.8 |
| 1 month | 51.8 | 1000 | 0.222 | 48.2 |

As shown in Table 1, the discharge capacity and the $(R_{ohm}+R_{ele})$ of a battery change in proportion to the duration of high temperature storing. Accordingly, it is found that the degree of deterioration of the battery can be estimated from the ($R_{ohm}+R_{ele}$).

In the present example, the sum of the internal resistance $R_{ohm}$ of each electrode and the internal resistance $R_{ele}$ of each ion conductor, which are electrochemical parameters, was used, however, other parameters may be measured as electrochemical parameters used for the detection of deterioration.

Further, since the discharge capacity can be estimated from the degree of deterioration, the remaining capacity of the battery can be estimated during discharging, for example, using an integrated current method as shown in Equation (34):

Remaining capacity (%)=((100−(integrated current)/(discharge capacity estimated from degree of deterioration))×100 (34)

Accordingly, the present invention can be used as a remaining capacity detecting method.

EXAMPLE 2

In the present example, an example of a deterioration detecting method and a remaining capacity detecting method in accordance with the present invention are described in the case where that a nickel-hydride secondary battery is used.

The following charge/discharge cycle tests were conducted on nickel-hydride secondary batteries each having a nominal capacity of 1200 mAh and a nominal voltage of 1.2 V for the purpose of advancing the deterioration thereof.

According to a constant current charging method, which is the recommended method of charging of the present batteries, they were energized by a constant correct of 120 mA; and when the charge capacity reached 120%, the charging was terminated. The remaining capacity of the batteries in this state was defined as 100%. After the charge, the batteries were discharged at a constant current of 240 mA until the voltage decreased to 1.0 V. The above-mentioned charging and discharging were carried out in a thermostat at 20° C.

The characteristics of batteries having undergone one cycle, 200 cycles and 400 cycles, respectively, of the above-mentioned charging and discharging were evaluated. FIG. 5 shows the discharge curves of these batteries.

In FIG. 5, the vertical axis indicates the voltage, and the horizontal axis indicates the discharge capacity normalized at 100%. As is obvious from FIG. 5, with the increase of the number of charge/discharge cycles, the battery capacity decreased gradually, and the deterioration of batteries advanced.

Figure 6:
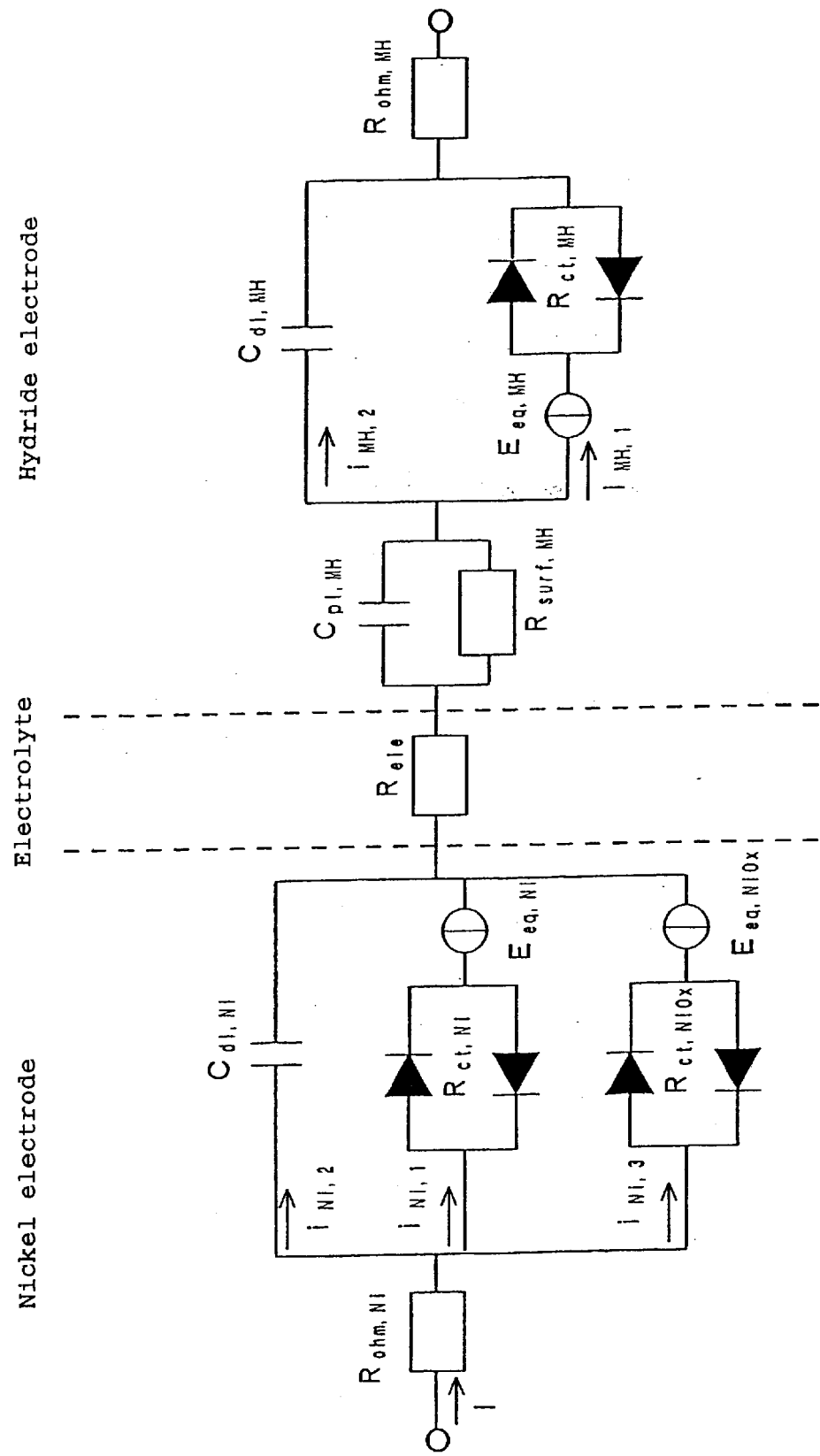
FIG. 6 is a block diagram showing the electrochemical model used in the same example.

Next, by setting the values of the respective electrochemical parameters and by using the above-mentioned electrochemical model for a nickel-hydride secondary battery, the discharge curve in the first cycle was reproduced. This reproduction was carried out by a simulation using, as the electrochemical model, an equivalent circuit involving the above-mentioned formulas as shown in FIG. 6. Further, in order to replace the discharge curve obtained by the measurement with the model, that is, in order to accurately reproduce the discharge curve as the equivalent circuit, the fitting of the model was carried out by the least square method.

The values of the respective electrochemical parameters used for the calculation are shown in Tables. 2 and 3.

TABLE 2

| Parameter | Value after 1st cycle |
|---|---|
| Standard potential of Ni electrode $E_{0,\,Ni}$ [V] | 0.35 |
| Temperature coefficient of standard potential of Ni electrode $dE_{0,\,Ni}/dT$ [V/K] | −0.0014 |
| Exchange current density of redox reaction of Ni electrode $i_{0,\,Ni}$ [A/m$^2$] | 0.0121 |
| Internal resistance of Ni electrode $R_{ohm,\,Ni}$ [Ω] | 0.0048 |
| Charge transfer coefficient of redox reaction of Ni electrode $\alpha_{Ni}$ | 0.5 |
| Activation energy of redox reaction of Ni electrode $E_{a,\,Ni}$ [J/mol] | 30000 |
| Diffusion coefficient of protons in Ni electrode $D_{Ni}$ [m$^2$/sec] | 5.0 × 10$^{-13}$ |
| Activation energy of diffusion of protons in Ni electrode $E_{diff,\,Ni}$ [J/mol] | 25000 |
| Electric double layer capacitance of Ni electrode $C_{dl,\,Ni}$ [F/m$^2$] | 0.2 |
| Surface area of Ni electrode A [m$^2$/g] | 4.0 |
| Thickness of Ni electrode $x_L$ [m] | 5.5 × 10$^{-6}$ |
| Capacity (discharge capacity) of Ni electrode $C_{Ni}$ [%] | 100 |
| Standard potential of oxygen generating reaction of Ni electrode $E_{0,\,NiOx}$ [V] | 0.3 |
| Solubility coefficient of oxygen into aqueous KOH solution Ks [Pa · m$^3$/mol] | 2.0 × 10$^{-6}$ |
| Temperature coefficient of standard potential of oxygen generating reaction of Ni electrode $dE_{0,\,NiOx}/dT$ [V/K] | −0.0015 |
| Exchange current density of oxygen generating reaction of Ni electrode $i_{0,\,NiOx}$ [A/m$^2$] | 1.0 × 10$^{-8}$ |
| Charge transfer coefficient of oxygen generating reaction of Ni electrode $\alpha_{NiOx}$ | 0.5 |
| Activation energy of oxygen generating reaction of Ni electrode $E_{a,\,NiOx}$ [J/mol] | 40000 |
| Internal resistance of aqueous KOH solution $R_{ele}$ [Ω] | 0.0221 |

TABLE 3

| Parameter and physical constant | Value after 1st cycle |
|---|---|
| Standard potential of hydride electrode $E_{0,\,MH}$ [V] | −0.910 |
| Temperature coefficient of standard potential of hydride electrode $dE_{0,\,MH}/dT$ [V/K] | −0.001 |
| Exchange current density of redox reaction of hydride electrode $i_{0,\,MH}$ [A/m$^2$] | 0.0120 |
| Internal resistance of hydride electrode $R_{ohm,\,MH}$ [Ω] | 0.0051 |
| Charge transfer coefficient of redox reaction of hydride electrode $\alpha_{MH}$ | 0.5 |
| Activation energy of redox reaction of hydride electrode $E_{a,\,MH}$ [J/mol] | 50000 |
| Diffusion coefficient of protons in hydride electrode $D_{MH}$ [m$^2$/sec] | 2.10 × 10$^{-13}$ |
| Activation energy of diffusion of protons in hydride electrode $E_{diff,\,MH}$ [J/mol] | 25000 |
| Electric double layer capacitance of hydride electrode $C_{dl,\,MH}$ [F/m$^2$] | 0.2 |
| Surface area of hydride electrode A [m$^2$/g] | 4 |
| Thickness of hydride electrode $x_L$ [m] | 1.0 × 10$^{-5}$ |
| Film resistance of surface film of hydride electrode $R_{surf,\,MH}$ [Ω] | 0.0054 |
| Film capacitance of surface film of hydride electrode $C_{surf,\,MH}$ [F/m$^2$] | 0.0022 |
| Battery volume V [m$^3$] | 1.0 × 10$^{-8}$ |
| Gas constant R [J/mol] | 8.314 |
| Temperature T [K.] | 293 |
| Faraday constant F [C/mol] | 96500 |

Figure 7:
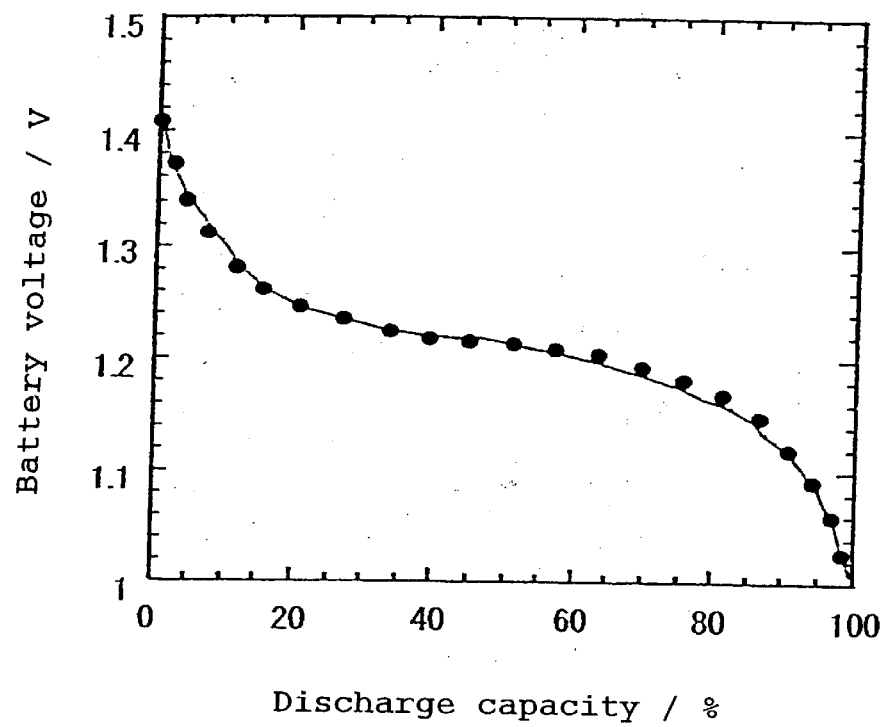
FIG. 7 is a diagram showing a discharge curve and the calculated values thereof in the first cycle measured in the same example.

The calculated values obtained by the circuit simulator and the discharge curve obtained by the actual measurement are shown in FIG. 7. In FIG. 7, the vertical axis indicates the voltage, and the horizontal axis indicates the discharge capacity normalized at 100%. A mark ● indicates a calculated value. As is obvious from FIG. 7, the calculated values are identical with the discharge curve obtained by the measurement. Accordingly, it is understood that the calculated discharge curve reproduces the discharge curve obtained by the measurement in the first cycle.

Similarly, discharge curves were calculated using a similar electrochemical model for the 200th cycle and the 400th cycle in which deterioration was recognized. The electrochemical parameters obtained by fitting the discharge curves of the 200th cycle and the 400th cycle are listed in Tables 4 to 7.

TABLE 4

| Parameter | Value after 200th cycle | Value after 400th cycle |
|---|---|---|
| Standard potential of Ni electrode $E_{0,\,Ni}$ [V] | 0.35 | 0.35 |
| Temperature coefficient of standard potential of Ni electrode $dE_{0,\,Ni}/dT$ [V/K] | −0.0014 | −0.0014 |
| Exchange current density of redox reaction of Ni electrode $i_{0,\,Ni}$ [A/m$^2$] | 0.0081 | 0.0068 |
| Internal resistance of Ni electrode $R_{ohm,\,Ni}$ [Ω] | 0.0063 | 0.0074 |
| Charge transfer coefficient of redox reaction of Ni electrode $\alpha_{Ni}$ | 0.5 | 0.5 |
| Activation energy of redox reaction of Ni electrode $E_{a,\,Ni}$ [J/mol] | 30000 | 30000 |
| Diffusion coefficient of protons in Ni electrode $D_{Ni}$ [m$^2$/sec] | 2.4 × 10$^{-13}$ | 0.82 × 10$^{-13}$ |
| Activation energy of diffusion of protons in Ni electrode $E_{diff,\,Ni}$ [J/mol] | 25000 | 25000 |
| Electric double layer capacitance of Ni electrode $C_{dl,\,Ni}$ [F/m$^2$] | 0.2 | 0.2 |
| Surface area of Ni electrode A [m$^2$/g] | 4.0 | 4.0 |
| Thickness of Ni electrode $x_L$ [m] | 5.5 × 10$^{-6}$ | 5.5 × 10$^{-6}$ |
| Capacity (discharge capacity) of Ni electrode $C_{Ni}$ [%] | 83.5 | 67.0 |
| Standard potential of oxygen generating reaction of Ni electrode $E_{0,\,NiOx}$ [V] | 0.3 | 0.3 |
| Solubility coefficient of oxygen into aqueous KOH solution Ks [Pa · m$^3$/mol] | 2.0 × 10$^{-6}$ | 2.0 × 10$^{-6}$ |

TABLE 5

| Parameter | Value after 200th cycle | Value after 400th cycle |
|---|---|---|
| Temperature coefficient of standard potential of oxygen generating reaction of Ni electrode $dE_{0,\,NiOx}/dT$ [V/K] | −0.0015 | −0.0015 |
| Exchange current density of oxygen generating reaction of Ni electrode $i_{0,\,NiOx}$ [A/m$^2$] | 1.0 × 10$^{-8}$ | 1.0 × 10$^{-8}$ |
| Charge transfer coefficient of oxygen generating reaction of Ni electrode $\alpha_{NiOx}$ | 0.5 | 0.5 |
| Activation energy of oxygen generating reaction of Ni electrode $E_{a,\,NiOx}$ [J/mol] | 40000 | 40000 |
| Internal resistance of aqueous KOH solution $R_{ele}$ [Ω] | 0.0328 | 0.0481 |
| Standard potential of hydride electrode $E_{0,\,MH}$ [V] | −0.910 | −0.910 |
| Temperature coefficient of standard potential of hydride electrode $dE_{0,\,MH}/dT$ [V/K] | −0.001 | −0.001 |
| Exchange current density of redox reaction of hydride electrode $i_{0,\,MH}$ [A/m$^2$] | 0.0078 | 0.0053 |
| Internal resistance of hydride electrode $R_{ohm,\,MH}$ [Ω] | 0.0072 | 0.0088 |
| Charge transfer coefficient of redox reaction of hydride electrode $\alpha_{MH}$ | 0.5 | 0.5 |
| Activation energy of redox reaction of hydride electrode $E_{a,\,MH}$ [J/mol] | 50000 | 50000 |
| Diffusion coefficient of protons in hydride electrode $D_{MH}$ [m$^2$/sec] | 0.98 × 10$^{-13}$ | 0.74 × 10$^{-13}$ |
| Activation energy of diffusion of protons in hydride electrode $E_{diff,\,Ni}$ [J/mol] | 25000 | 25000 |

TABLE 6

| Parameter | Value after 200th cycle | Value after 400th cycle |
|---|---|---|
| Temperature coefficient of standard potential of oxygen generating reaction of Ni electrode $dE_{0,\,NiOx}/dT$ [V/K] | −0.0015 | −0.0015 |
| Exchange current density of oxygen generating reaction of Ni electrode $i_{0,\,NiOx}$ [A/m$^2$] | 1.0 × 10$^{-8}$ | 1.0 × 10$^{-8}$ |
| Charge transfer coefficient of oxygen generating reaction of Ni electrode $\alpha_{NiOx}$ | 0.5 | 0.5 |
| Activation energy of oxygen generating reaction of Ni electrode $E_{a,\,NiOx}$ [J/mol] | 40000 | 40000 |
| Internal resistance of aqueous KOH solution $R_{ele}$ [Ω] | 0.0328 | 0.0481 |
| Standard potential of hydride electrode $E_{0,\,MH}$ [V] | −0.910 | −0.910 |
| Temperature coefficient of standard potential of hydride electrode $dE_{0,\,MH}/dT$ [V/K] | −0.001 | −0.001 |
| Exchange current density of redox reaction of hydride electrode $i_{0,\,MH}$ [A/m$^2$] | 0.0078 | 0.0053 |
| Internal resistance of hydride electrode $R_{ohm,\,MH}$ [Ω] | 0.0072 | 0.0088 |
| Charge transfer coefficient of redox reaction of hydride electrode $\alpha_{MH}$ | 0.5 | 0.5 |
| Activation energy of redox reaction of hydride electrode $E_{a,\,MH}$ [J/mol] | 50000 | 50000 |
| Diffusion coefficient of protons in hydride electrode $D_{MH}$ [m$^2$/sec] | 0.98 × 10$^{-13}$ | 0.74 × 10$^{-13}$ |
| Activation energy of diffusion of protons in hydride electrode $E_{diff,\,Ni}$ [J/mol] | 25000 | 25000 |

TABLE 7

| Parameter and physical constant | Value after 200th cycle | Value after 400th cycle |
|---|---|---|
| Electric double layer capacitance of hydride electrode $C_{dl,\,MH}$ [F/m$^2$] | 0.2 | 0.2 |
| Surface area of hydride electrode A [m$^2$/g] | 4 | 4 |
| Thickness of hydride electrode $x_L$ [m] | 1.0 × 10$^{-5}$ | 1.0 × 10$^{-5}$ |
| Film resistance of surface film of hydride electrode $R_{surf,\,MH}$ [Ω] | 0.0077 | 0.0085 |
| Film capacitance of surface film of hydride electrode $C_{surf,\,MH}$ [F/m$^2$] | 0.0041 | 0.0050 |
| Battery volume V [m$^3$] | 1.0 × 10$^{-8}$ | 1.0 × 10$^{-8}$ |
| Gas constant R [J/mol] | 8.314 | 8.314 |
| Temperature T [K] | 293 | 293 |
| Faraday constant F [C/mol] | 96500 | 96500 |

Figure 8:
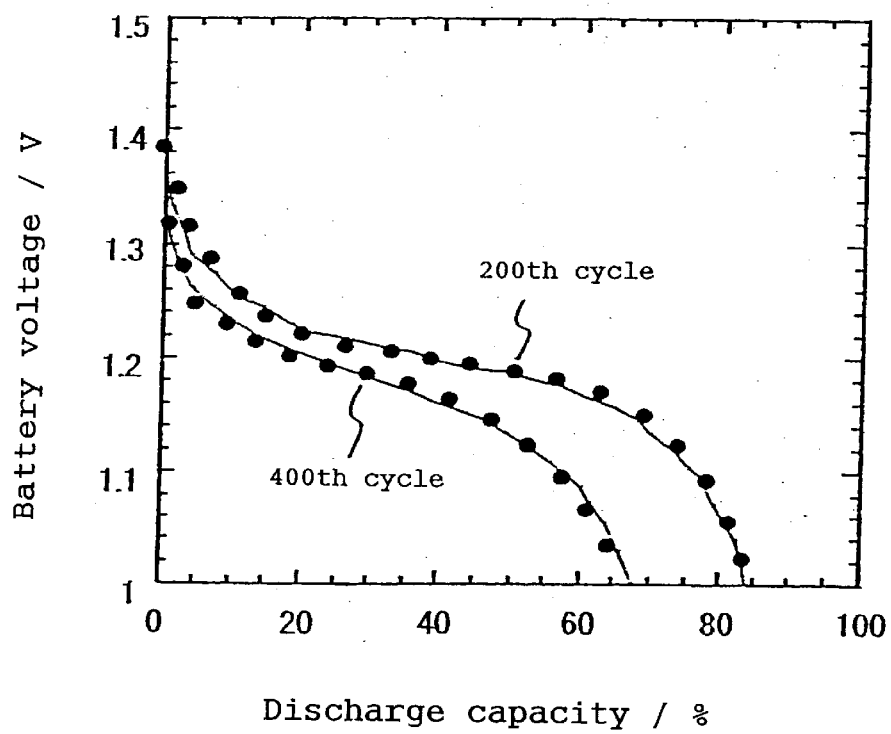
FIG. 8 is a diagram showing discharge curves and the calculated values thereof in the 200th cycle and the 400th cycle measured in the same example.

The calculated values obtained by the circuit simulator and the discharge curves obtained by the actual measurement are shown in FIG. 8. In FIG. 8, the vertical axis indicates the voltage, and the horizontal axis indicates the discharge capacity normalized at 100%. A mark ● indicates a calculated value.

As is obvious from FIG. 8, the calculated values are identical with the discharge curves obtained by the measurement. Accordingly, it is understood that the discharge curves of deteriorated batteries can also be reproduced by the calculation.

The values of the electrochemical parameters obtained by the fitting changed with the advance of deterioration.

The discharge capacity and the degree of deterioration in each cycle as well as the values of electrochemical parameters $R_{ele}$ and $i_{0,MH}$ at that time are Table 8. The degree of deterioration indicates the amount of decrease in discharge capacity.

TABLE 8

| Cycle | Discharge capacity (%) | $R_{ele}$ (Ω) | $i_{0,MH}$ (A/m$^2$) | Degree of deterioration (%) |
|---|---|---|---|---|
| 1 | 100 | 0.0221 | 0.0120 | — |
| 200 | 83.5 | 0.0328 | 0.0078 | 16.5 |
| 400 | 67.0 | 0.0481 | 0.0053 | 33.0 |

As is obvious from Table 8, the battery discharge capacity, the value $R_{ele}$, and the value $i_{0,MH}$ change linearly with the increase of the number of charge/discharge cycles. Accordingly, it is understood that by using an electrochemical model, the degree of deterioration of the battery can be estimated from the change in the values of the electrochemical parameters in the electrochemical model.

Further, since the discharge capacity can be estimated from the degree of deterioration, the remaining capacity of the battery can be estimated by estimating the integrated current, for example, using an integrated current scheme during discharging.

In the present example, the $R_{ele}$ or the $i_{0,MH}$ was used as an electrochemical parameter to be calculated by the fitting, however, another parameter may be used. Further, it is also possible that a circuit is constructed using a formula other than the above-mentioned one and that the calculation is carried out.

Further, in addition to constructing an equivalent circuit thereby to reproduce the discharge curves obtained by the measurement using the circuit simulator, the nonlinear simultaneous equations may be directly solved, and the formula of each model used in the electrochemical model may be replaced by an approximate formula thereby to solve it.

Industrial Applicability

In accordance with the present invention, it is possible to provide a deterioration detecting method for an electrochemical device, wherein the degree of deterioration of the electrochemical device can be found without the disassembling thereof. Further, it is possible to provide an accurate remaining capacity detecting method wherein the deterioration is considered.

By using a deterioration detecting method and a remaining capacity detecting method for an electrochemical device in accordance with the present invention, it is possible to provide an excellent charger.

What is claimed is:

1. A deterioration detecting method for an electrochemical device comprising electrodes and an ion conductor, wherein an electrochemical characteristic of said electrochemical device is detected, and an obtained detection value indicating said electrochemical characteristic is then compared with a previously stored reference value indicating a standard electrochemical characteristic of said electrochemical device to estimate the degree of deterioration of said electrochemical device.

2. The deterioration detecting method for an electrochemical device in accordance with claim 1, wherein a model which expresses an electrochemical characteristic of a component of said electrochemical device by a parameter, a value of said parameter indicating said electrochemical characteristic of said component is calculated from a detection value obtained by detecting said electrochemical characteristic of said electrochemical device, and said value of said parameter is compared with a reference value indicating a standard electrochemical characteristic of said component to estimate the degree of deterioration of said electrochemical device.

3. The deterioration detecting method for an electrochemical device in accordance with claim 2, wherein said parameter is the sum of the internal resistance of said electrode and the internal resistance of said ion conductor.

4. The deterioration detecting method for an electrochemical device in accordance with claim 2, wherein said model comprises at least one selected from the group consisting of a potential model of said electrode, an electron transport model of said electrode, an ion transport model of said electrode, an ion transport model of said ion conductor, and a model representing an electrochemical reaction occurring in the interface between said electrode and said ion conductor.

5. A remaining capacity detecting method for an electrochemical device, wherein a capacity value of said electrochemical device is estimated based on the degree of deterioration obtained by the deterioration detecting method for an electrochemical device in accordance with claim 1, and a remaining capacity of said electrochemical device is calculated using the obtained capacity value.

6. A charger comprising:
a means for detecting an electrochemical characteristic of a battery; a means for estimating the degree of deterioration of said battery by comparing an obtained electrochemical characteristic with a previously stored reference value indicating a standard electrochemical characteristic of said battery; and a means for controlling the discharge of said battery based on an obtained degree of deterioration.

7. A discharge controlling apparatus comprising:
a means for detecting an electrochemical characteristic of a battery; a means for estimating the degree of deterioration of said battery by comparing an obtained electrochemical characteristic with a previously stored reference value indicating a standard electrochemical characteristic of said battery; and a means for controlling the discharge of said battery based on an obtained degree of deterioration.

8. The deterioration detecting method of claim 1, wherein said previously stored reference value represents the value of the standard electrochemical characteristic of said electrochemical device prior to deterioration of said electrochemical device.

9. The charger according to claim 6, further comprising storage means for storing said reference value.

10. The discharge controlling apparatus according to claim 7, further comprising storage means for storing said reference value.

11. The charger according to claim 6, wherein said previously stored reference value represents the value of the standard electrochemical characteristic of said battery prior to deterioration of said battery.

12. The discharge controlling apparatus according to claim 7, wherein said previously stored reference value represents the value of the standard electrochemical characteristic of said battery prior to deterioration of said battery.

* * * * *